(12) United States Patent
Minami

(10) Patent No.: US 6,865,882 B2
(45) Date of Patent: Mar. 15, 2005

(54) DEVICE FOR PURIFYING EXHAUST GAS OF DIESEL ENGINES

(75) Inventor: Toshitaka Minami, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/153,775

(22) Filed: May 24, 2002

(65) Prior Publication Data

US 2002/0174648 A1 Nov. 28, 2002

(30) Foreign Application Priority Data

May 24, 2001 (JP) .................................... 2001-155894

(51) Int. Cl.⁷ ................................................ F01N 3/00
(52) U.S. Cl. ........................... 60/295; 60/288; 60/292; 60/300; 60/311
(58) Field of Search ........................ 60/284–288, 292, 60/295, 297, 300, 311; 422/169, 170, 171, 177

(56) References Cited

U.S. PATENT DOCUMENTS

| | | | |
|---|---|---|---|
| 3,791,143 A | | 2/1974 | Keith et al. |
| 4,211,075 A | * | 7/1980 | Ludecke et al. ............. 60/285 |
| 4,485,621 A | * | 12/1984 | Wong et al. ................. 60/274 |
| 4,562,695 A | | 1/1986 | Rao et al. |
| 4,625,511 A | * | 12/1986 | Scheitlin et al. ............. 60/299 |
| 4,835,963 A | * | 6/1989 | Hardy ......................... 60/286 |
| 5,063,736 A | | 11/1991 | Hough et al. |
| 5,067,320 A | | 11/1991 | Kanesaki |
| 5,085,049 A | * | 2/1992 | Rim et al. .................... 60/288 |
| 5,097,665 A | | 3/1992 | Kammel |
| 5,195,318 A | | 3/1993 | Shinzawa et al. |
| 5,433,074 A | * | 7/1995 | Seto et al. ................... 60/297 |
| 5,489,319 A | * | 2/1996 | Tokuda et al. ............... 60/311 |
| 5,497,620 A | * | 3/1996 | Stobbe ......................... 60/311 |
| 5,517,820 A | * | 5/1996 | Kuroda et al. ............... 60/274 |
| 5,771,683 A | * | 6/1998 | Webb ........................... 60/274 |
| 2002/0194842 A1 | * | 12/2002 | Minami ....................... 60/288 |
| 2003/0110761 A1 | * | 6/2003 | Minami ....................... 60/280 |

FOREIGN PATENT DOCUMENTS

| | | |
|---|---|---|
| DE | 39 18601 A1 | 12/1990 |
| DE | 41 39 291 A1 | 6/1993 |
| DE | 199 26 138 A1 | 12/2000 |
| EP | 0 341 832 A2 | 11/1989 |
| EP | 0 758 713 A1 | 2/1997 |
| JP | 6-108884 * | 4/1994 |

OTHER PUBLICATIONS

European Search Report dated Apr. 1, 2004.

* cited by examiner

*Primary Examiner*—Thomas Denion
*Assistant Examiner*—Tu M. Nguyen (57) ABSTRACT

A diesel engine exhaust gas purifying device includes a first continuous regeneration type diesel particulate filter in the exhaust gas passage, a by-path by-passing a portion of the exhaust gas passage upstream of the first continuous regeneration type diesel particulate filter, a second continuous regeneration type diesel particulate filter in the by-path, a change-over valve in the exhaust gas passage between the ends of by-path, an exhaust gas temperature-elevating mechanism, an exhaust gas temperature region detecting mechanism, and a control mechanism for controlling the exhaust gas temperature-elevating mechanism and the change-over valve based on the exhaust gas temperature region. When the exhaust gas temperature region of the engine is in a temperature range lower than a predetermined temperature region, the control mechanism actuates the exhaust gas temperature-elevating mechanism and controls the change-over valve so that the exhaust gas passes through the second continuous regeneration type diesel particulate filter.

8 Claims, 10 Drawing Sheets

VALVE LIFT CURVES

MAP OF EXHAUST GAS TEMP. REGIONS

Fig. 7

CONTROL MAP DEPENDING UPON
EXHAUST GAS TEMP. REGIONS

| REGION | EGR VALVE | INTAKE SHUTTER | EXHAUST SHUTTER |
|---|---|---|---|
| X | FULLY CLOSED | FULLY OPEN | FULLY OPEN |
| Y | OPEN | FULLY OPEN | FULLY OPEN |
| Z | OPEN | CONTROL BASED ON INTAKE SHUTTER OPENING – DEGREE MAP | CONTROL BASED ON EXHAUST GAS SHUTTER OPENING – DEGREE MAP |

DEVICE FOR PURIFYING EXHAUST GAS OF DIESEL ENGINES

FIELD OF THE INVENTION

The present invention relates to a device for purifying exhaust gas by removing particulate matters contained in the exhaust gas of diesel engines.

DESCRIPTION OF THE RELATED ART

Regulations are now becoming stringent year after year against the exhaust gases emitted from internal combustion engines, and particularly from diesel engines. In particular, it is becoming an urgent necessity to reduce particulate matters (hereinafter referred to as PMs) which chiefly comprise carbon. As a device for removing PMs from the exhaust gas, there has been known a diesel particulate filter (hereinafter referred to as DPF), and a trend toward obligatorily furnishing the diesel engine-mounted vehicles with the DPF is also becoming common.

However, the DPF with which diesel engine-mounted vehicles are furnished must be regenerated by burning the trapped PMs because the trapped PMs are deposited thereon due to repetitive operation of the engine. As a means for regeneration there is known a system in which the PMs are burned by heating them, using an electric heater or a burner. When the system that burns the PMs is employed, the PMs cannot be trapped while the DPF is under regeneration. Therefore, a system is used in which a plurality of DPFs are arranged in parallel in the exhaust gas passage, and trapping and burning are conducted alternately. This system, however, creates a problem that a device large in scale is required. Further, the system which burns the PMs has another problem of how to secure durability of the filter, since the PMs are burned at a high temperature. Because of these reasons, the system which burns trapped PMs has not been widely employed.

Figure 10:
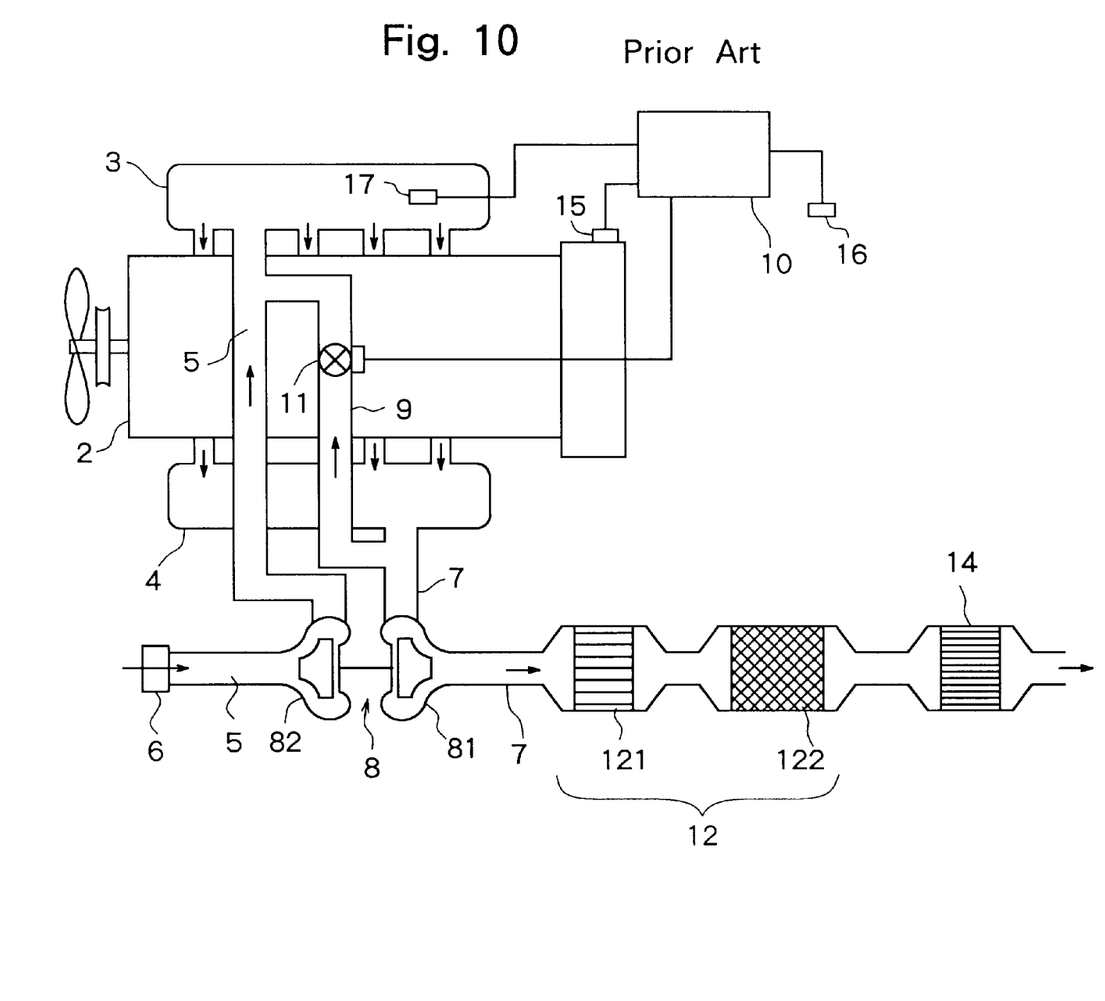
FIG. 10 is a diagram illustrating a conventional device for purifying exhaust gas of a diesel engine.

In view of the above-mentioned problems, there has recently been proposed, as a device for purifying exhaust gas of diesel engines, a system according to which the DPF carries a NOx occluding/reducing catalyst as disclosed in Japanese Patent No. 2600492, and the trapped PMs are continuously burned by utilizing active oxygen that generates when the NOx is occluded and reduced. Another device for purifying exhaust gas of the continuous regeneration type has been disclosed in, for example, Japanese Patent No. 3012249. FIG. 10 in the accompanying drawings illustrates a device for purifying exhaust gas of a diesel engine which is equipped with a known continuous regeneration type diesel particulate filter (hereinafter referred to as "continuous regeneration type DPF"). The device for purifying exhaust gas of the diesel engine equipped with the continuous regeneration type DPF will be described below with reference to FIG. 10.

On an engine body 2 constituted by a cylinder block, a cylinder head and the like, there are arranged an intake manifold 3, that constitutes part of the intake air passage and an exhaust manifold 4 that constitutes part of the exhaust gas passage. An intake pipe 5 that constitutes part of the intake air passage is connected to the intake manifold 3, and an air cleaner 6 for cleaning the intake air is arranged at the most upstream portion of the intake pipe 5. The intake air cleaned through the air cleaner 6 is fed into a cylinder that is not shown, through the intake pipe 5 and the intake manifold 3. An exhaust pipe 7 that constitutes part of the exhaust gas passage is connected to the exhaust manifold 4, and the exhaust gas formed in the cylinder is emitted through the exhaust manifold 4 and the exhaust pipe 7.

The illustrated diesel engine is equipped with a turbo charger 8 for supercharging the intake air. The turbo charger 8 has an exhaust gas turbine 81 arranged in the exhaust pipe 7 and an intake compressor 82 arranged in the intake pipe 5. Further, the illustrated diesel engine has an exhaust gas recirculation (hereinafter referred to as EGR) passage 9 for communicating the exhaust pipe 7 on the upstream side of the exhaust gas turbine 81 with the intake pipe 5 on the downstream side of the intake compressor 82. An EGR valve 11 is disposed in the EGR passage 9. The EGR valve 11 has, for example, a negative pressure actuator connected to a negative pressure tank that is not shown, and the amount of negative pressure supplied thereto is controlled by a control means 10 that will be described later, according to the operating conditions to control the opening degree of the EGR valve 11 or EGR ratio. As is well known, the EGR is an exhaust gas purifying means that suppresses NOx by feeding into the cylinder the intake air into which the burned exhaust gas has been recirculated. In this prior art, the EGR passage and the engine side are communicated through the intake pipe and the exhaust pipe. It is obvious, however, that the above communication may be accomplished by using the intake manifold that constitutes part of the intake air passage and by using the exhaust manifold.

In the exhaust pipe 7 on the downstream side of the exhaust gas turbine 81, there are arranged a continuous regeneration type diesel particulate filter 12 having an oxidizing catalyst 121 and a DPF 122 in this order from the upstream side, and a NOx catalyst 14. The oxidizing catalyst 121 is obtained by coating the surfaces of a carrier made of, for example, honeycomb-like cordierite or a heat-resistant steel with active alumina or the like to form a wash coat layer, and carrying a catalytically active component formed of a novel metal such as platinum, palladium or rhodium on the coated layer. The oxidizing catalyst 121 oxidizes NO in the exhaust gas to form $NO_2$ and oxidizes HC and CO in the exhaust gas to form $H_2O$ and $CO_2$. The DPF 122 is a honeycomb filter of a so-called wall-flow type in which a number of cells are formed in parallel by using, for example, porous cordierite or silicon carbide, the inlets and outlets of the cells being alternately closed, or is a fiber type filter in which ceramic fibers are wound in many layers on a porous stainless pipe to trap PMs contained in the exhaust gas. The NOx catalyst 14 has the constitution and components which are the same as those of the oxidizing catalyst 121, and works to reduce NOx such as NO and the like in the exhaust gas into $N_2$ and $H_2O$. Thus, the continuous regeneration type DPF 12 is constituted by at least the above-mentioned oxidizing catalyst 121 and the DPF 122, where the oxidizing catalyst 121 oxidizes NO in the exhaust gas into $NO_2$ and the trapped PMs are burned with $NO_2$ that flows into the DPF 122 arranged on the downstream side of the oxidizing catalyst 121. At this moment, the PMs burn at a temperature lower than 400° C., and there is no need of providing any particular heating means such as an electric heater or a burner. While the PMs are continuously burned at a low temperature, the PMs are, at the same time, newly trapped. Therefore, the device as a whole is simply and compactly constructed advantageously.

Figure 13:
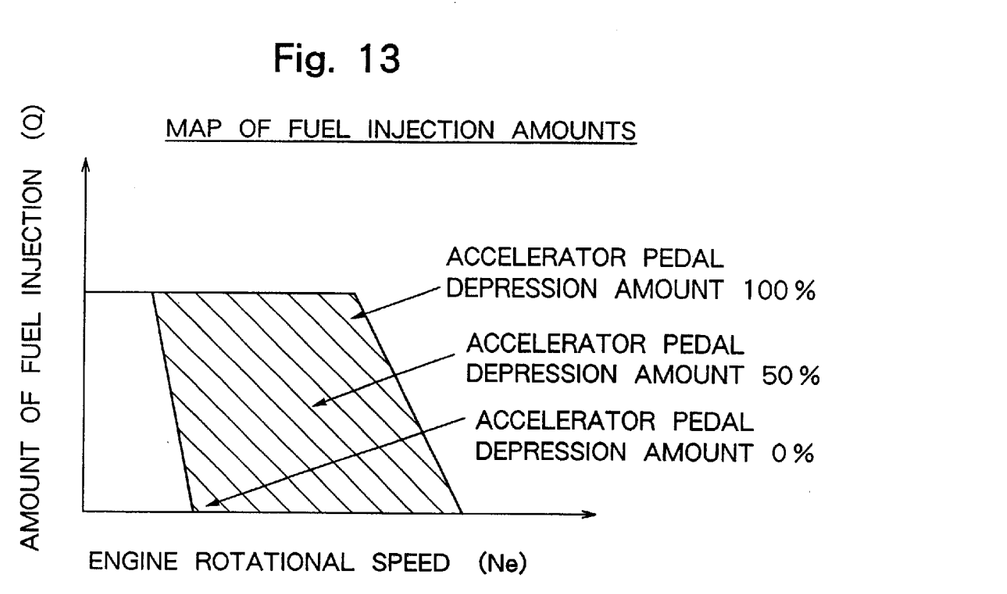
FIG. 13 is a diagram illustrating a map for calculating the amount of fuel injection from the engine rotational speed and the accelerator pedal depression amount.

The illustrated diesel engine comprises an engine rotational speed sensor 15 for detecting the rotational speed of the engine, an accelerator sensor 16 for detecting the accelerator pedal depression amount (ACL), an intake air temperature sensor 17 arranged in the intake manifold 3 for detecting the temperature of the air taken into the cylinder, and control means 10 for controlling the EGR valve 11 and the amount of fuel injected into the cylinder by a fuel injection device that is not shown, in response to detection signals from the engine rotational speed sensor 15, accelerator sensor 16, intake air temperature sensor 17, or the like. The control means 10 has a memory storing predetermined fuel injection amounts as shown in FIG. 13, in which the amounts of fuel injection are set by using the engine rotational speed and the accelerator pedal depression amount as parameters. The control means 10 determines a basic amount of fuel injection based on detection signals from the engine rotational speed sensor 15 and from the accelerator sensor 16. Further, the control means 10 corrects the basic amount of fuel injection based on a value detected by the intake air temperature sensor 17, and determines the final amount of fuel injection. The final amount of fuel injection can be corrected at any time based not only on the intake air temperature but also on other various parameters (atmospheric pressure, smoke-limit injection amount, etc.).

Figure 11:
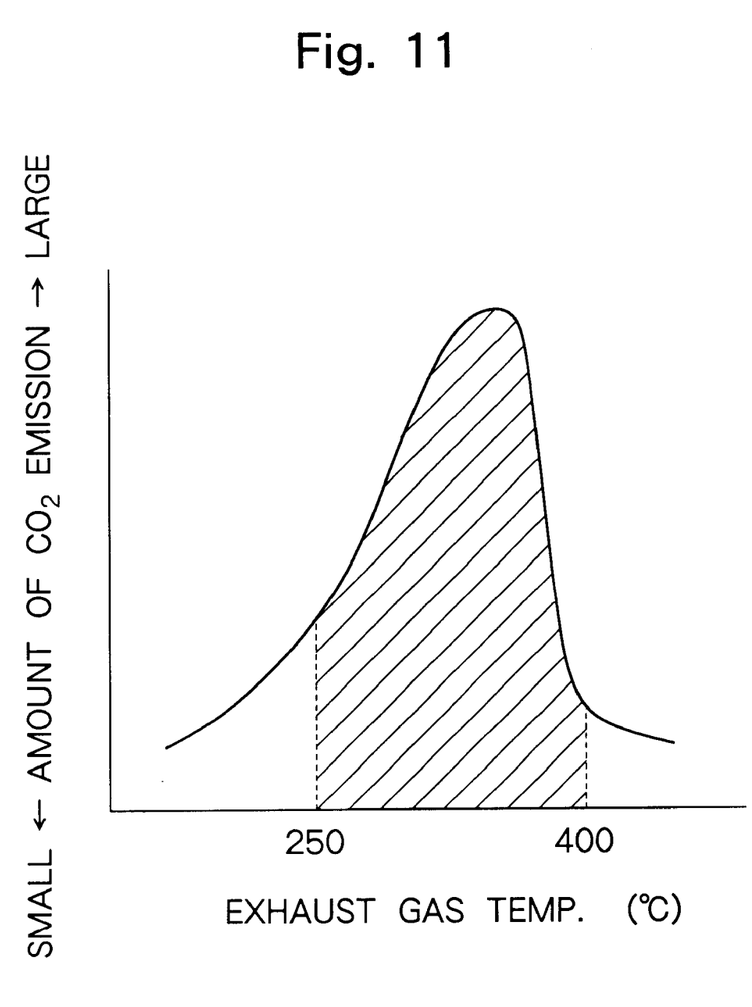
FIG. 11 is a graph illustrating the exhaust gas temperature and the PM burning characteristics in a continuous regeneration type DPF.

In the conventionally used catalysts, the reaction efficiency, or the so-called conversion, of the oxidizing catalyst 121 for oxidizing NO into $NO_2$, greatly varies depending upon the catalyst temperature. A favorable oxidizing reaction is observed in an active region of, for example, from 250° C. to 400° C. In other regions, however, NO is not converted into $NO_2$ to a sufficient degree. That is, the $NO_2$ component is not formed in an amount sufficient for oxidizing the PMs. FIG. 11 is a diagram illustrating the amount of $CO_2$ emitted by the oxidization combustion of the PMs with respect to the engine exhaust gas temperature, from which it can be seen that the PMs briskly burn at temperatures between 250° C. and 400° C. to regenerate the filter. Conversely, in other temperature regions, the PMs are not adequately burned, i.e., the DPF is not almost regenerated. Namely, in the temperature regions other than the temperature region of from 250° C. to 400° C., the DPF continues to trap the PMs without being regenerated. When the PMs start burning in a state where the PMs are accumulated in large amounts, burning quickly takes place to greatly spoil the durability of the filter.

Figure 12:
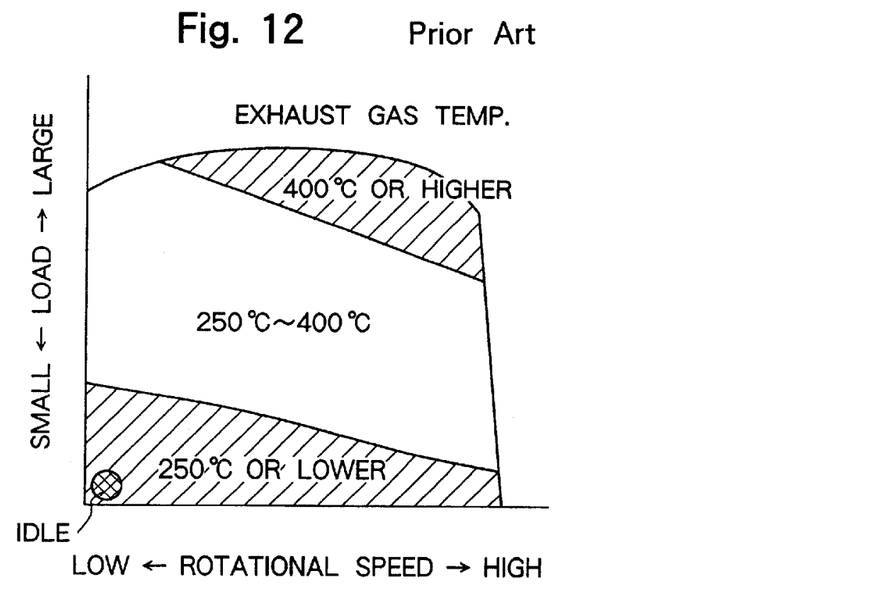
FIG. 12 is a graph illustrating a relationship between the rotational speed of a diesel engine and the exhaust gas temperature for the load.

The rotational speed and the load of a diesel engine mounted on a vehicle change from time to time depending upon the operating conditions, and the temperature of the exhaust gas emitted therefrom changes, too, depending upon the operating conditions. FIG. 12 illustrates temperature regions of the exhaust gas using the engine rotational speed and the engine load as parameters. As will be understood from FIG. 12, when the engine has a large load and runs at a high speed and when the engine has a small load and runs at a low speed, the temperatures of the catalyst lie outside the active temperature region (250° C. to 400°C.), and NO is not sufficiently oxidized into $NO_2$ by the oxidizing catalyst. Therefore, the PMs trapped by the DPF are not burned to a sufficient degree, the PM trapping efficiency of the filter drops and clogging of the filter itself occurs at an early time, which is not desirable. Further, when the exhaust gas temperature is low even though temperature of the exhaust gas lies within the active temperature region of the catalyst, heat is radiated to the outdoor air while the exhaust gas flows from the exhaust manifold to the oxidizing catalyst and, as a result, the exhaust gas temperature often becomes lower than the active temperature region.

The above prior art was described based on a continuous regeneration type DPF which is constituted by an oxidizing catalyst and a diesel particulate filter. Even by using a system in which the DPF carries the NOx occluding/reducing catalyst and the trapped PMs are continuously burned by utilizing active oxygen generated at the time of occluding and reducing NOx, however, limitation is imposed on the temperature region in which the catalyst effectively works, and, hence, the same problem occurs.

SUMMARY OF THE INVENTION

The object of the present invention is to reliably and continuously burn the PMs trapped by the DPF over a wide operation region of an engine.

In order to accomplish the above-mentioned object according to the present invention, there is provided a device for purifying exhaust gas of a diesel engine comprising a first continuous regeneration type diesel particulate filter arranged in the exhaust gas passage of a diesel engine, a by-path by-passing the exhaust gas passage on the upstream side of the first continuous regeneration type diesel particulate filter, a second continuous regeneration type diesel particulate filter disposed in the by-path, a change-over valve for changing over the flow passage of the exhaust gas, arranged in the exhaust gas passage between the ends of the by-path, an exhaust gas temperature-elevating means for elevating the temperature of the exhaust gas of the engine, an exhaust gas temperature region detecting means for detecting the exhaust gas temperature region of the engine, and a control means for controlling the exhaust gas temperature-elevating means and the change-over valve based on the exhaust gas temperature region of the engine detected by the exhaust gas temperature region detecting means, wherein, when the exhaust gas temperature region of the engine detected by the exhaust gas temperature region detecting means is a temperature region lower than a predetermined temperature region, the control means actuates the exhaust gas temperature-elevating means and controls the change-over valve so that the exhaust gas passes through the second continuous regeneration type diesel particulate filter.

The exhaust gas temperature region detecting means comprises an engine load detecting means for detecting the load of the engine, an engine rotational speed detecting means for detecting the rotational speed of the engine, and a map of exhaust gas temperature regions in which the exhaust gas temperature regions of the engine are set using the engine load and the engine rotational speed as parameters.

The exhaust gas temperature-elevating means comprises an intake air shutter disposed in the intake air passage.

It is further desired that the exhaust gas temperature-elevating means comprises an intake air shutter disposed in the intake air passage of the diesel engine, and an exhaust gas introduction mechanism for opening the exhaust gas passage of the cylinder during the intake stroke to the cylinder.

It is further desired that the exhaust gas temperature-elevating means comprises an intake air shutter disposed in the intake air passage of the diesel engine, an exhaust gas introduction mechanism for opening the exhaust gas passage of the cylinder during the intake stroke to the cylinder, and an exhaust gas shutter disposed in the exhaust gas passage.

It is desired that the control means controls the opening degree(s) of the intake air shutter and/or the exhaust gas shutter so as to become small stepwise as the exhaust gas temperature region of the engine detected by the exhaust gas temperature region detecting means becomes low.

DETAILED DESCRIPTION OF THE PREFERRED EMBODIMENTS

Figure 1:
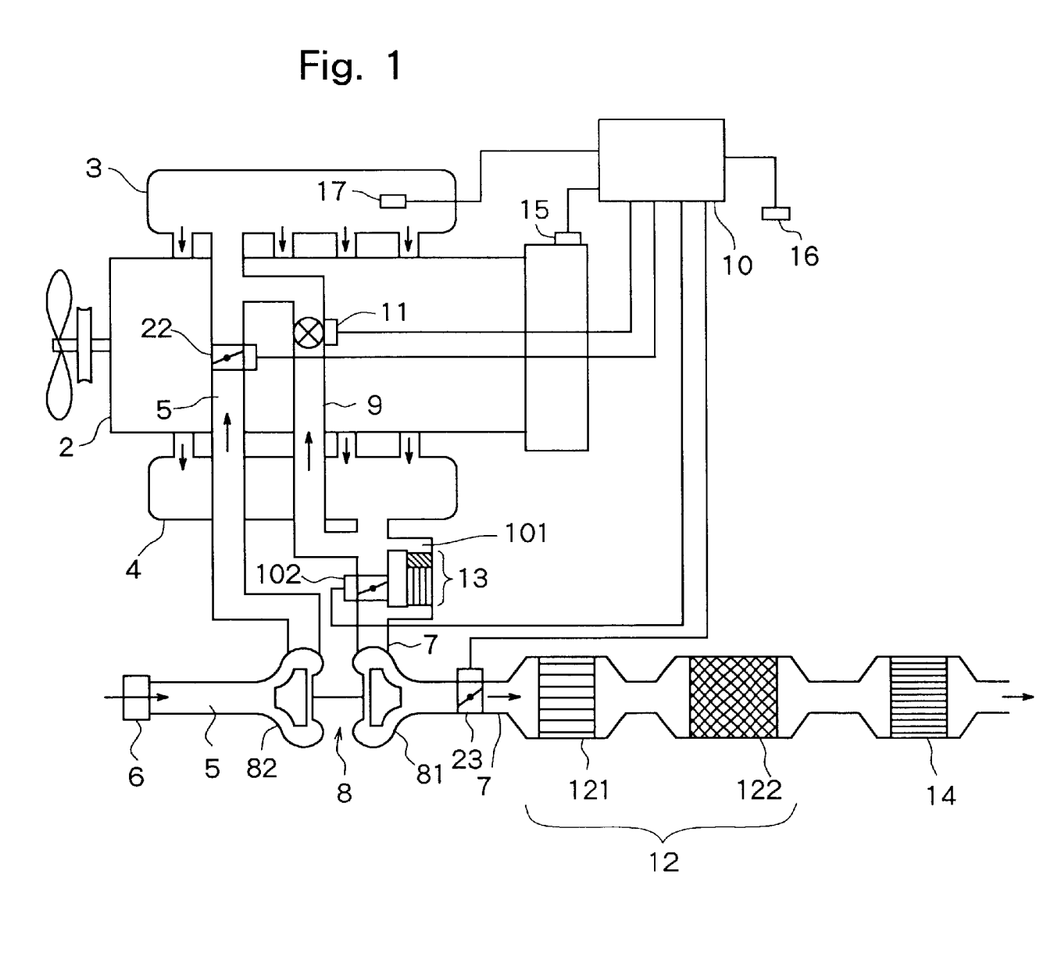
FIG. 1 is a diagram illustrating a device for purifying exhaust gas of a diesel engine constituted according to the present invention.

Preferred embodiments of the present invention will now be described in detail with reference to the drawings. FIG. 1 is a diagram schematically illustrating the constitution of a device for purifying exhaust gas of a diesel engine according to an embodiment of the present invention. In the embodiment illustrated in FIG. 1, the same constituent members as those of the conventional device for purifying exhaust gas shown in FIG. 10 are denoted by the same reference numerals but are not described here again.

The device for purifying exhaust gas of a diesel engine according to the embodiment shown in FIG. 1 is provided with an intake air shutter 22 for limiting the amount of the intake air in an intake pipe 5 which constitutes part of the intake air passage arranged on the upstream side of a portion where EGR passage 9 is coupled to the intake pipe 5. The intake air shutter 22 is normally fully opened. Further, an exhaust gas shutter 23 for limiting the flow-out of the exhaust gas is arranged in an exhaust pipe 7 which constitutes part of the exhaust gas passage, on the downstream side of a portion where the EGR passage 9 is coupled to the intake pipe 5. The exhaust gas shutter 23, too, is normally fully opened like the above intake air shutter 22. The intake air shutter 22 and the exhaust gas shutter 23 are equipped with, for example, negative actuators connected to a negative pressure tank that is not shown, and their opening degrees are controlled by controlling the negative pressure quantity supplied thereto by control means 10 according to the operating conditions.

Figure 2:
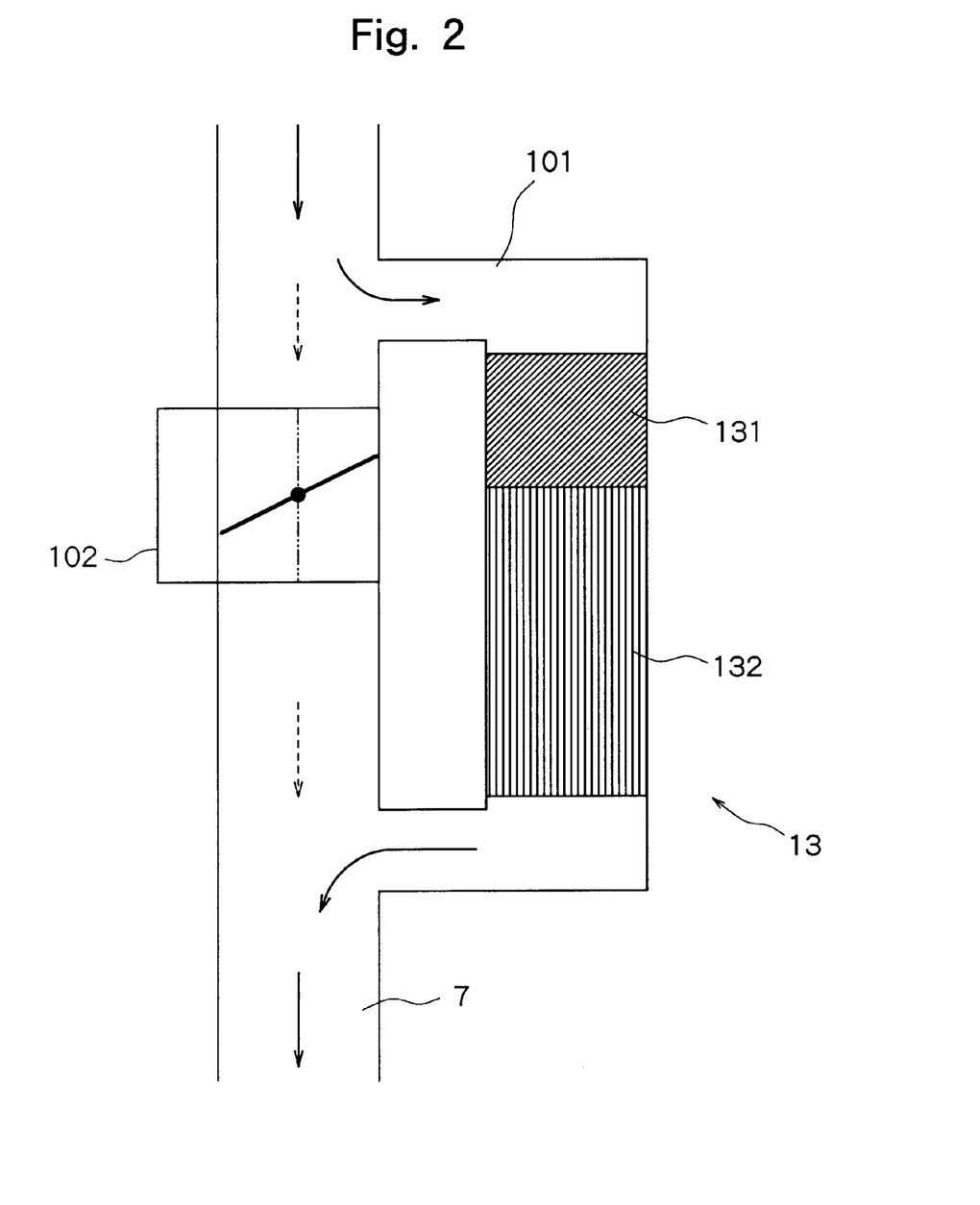
FIG. 2 is a diagram illustrating, on an enlarged scale, a second continuous regeneration type diesel particulate filter shown in FIG. 1.

The exhaust pipe 7, just subsequent to an exhaust manifold 4 constituting part of the exhaust gas passage, is provided with a by-path 101 by-passing the exhaust gas passage. As shown in FIG. 2, in the by-pass 101 is arranged a second continuous regeneration type DPF 13 having an oxidizing catalyst 131 and a particulate filter 132, like the above-mentioned first continuous regeneration type DPF 12 having the oxidizing catalyst 121 and the particulate filter 122. The capacity of the second continuous regeneration type DPF 13 is so constructed as to be smaller than the capacity of the first continuous regeneration type DPF 12. A change-over valve 102 for changing over the flow passage of the exhaust gas is arranged in the exhaust pipe 7 between the two ends of by-path 101. The change-over valve 102 is controlled by the control means 10 and lets the exhaust gas emitted from the exhaust manifold 4 flow in the by-path 101, i.e., to flow through the second continuous regeneration type DPF 13, when the change-over valve is closed.

Figure 3:
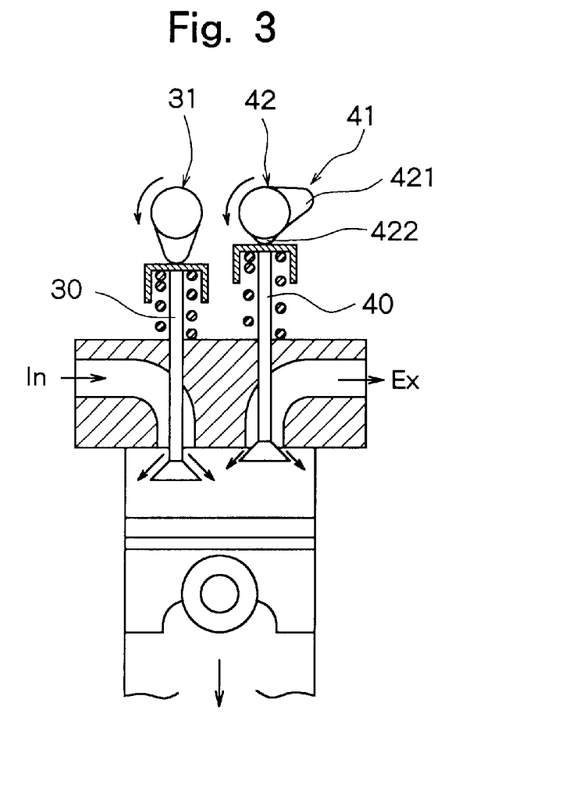
FIG. 3 is a diagram illustrating an embodiment of an exhaust gas introduction mechanism used in the present invention.
Figure 4:
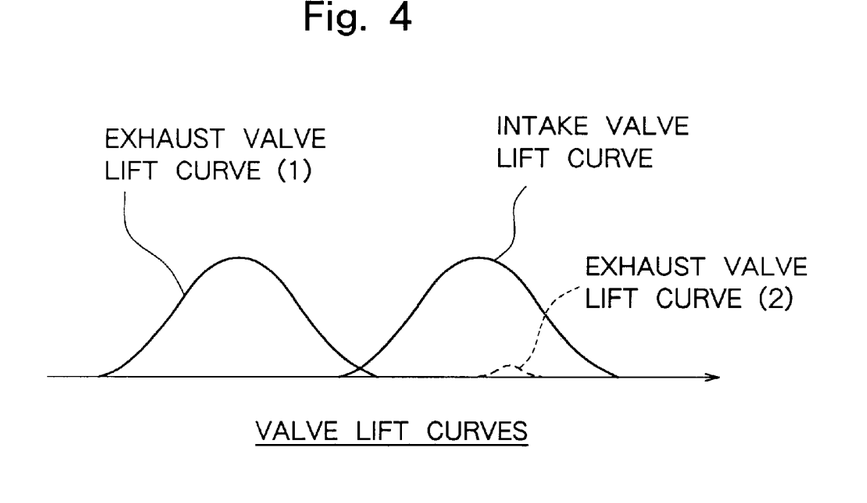
FIG. 4 is a diagram illustrating lift curves of an intake valve and an exhaust valve in the constitution of FIG. 3.

The diesel engine according to this embodiment is equipped with an exhaust gas introduction mechanism which, as shown in FIG. 3, permits the exhaust gas passage of the cylinder to be opened in the cylinder during the intake stroke. FIG. 3 illustrates an intake valve 30, an intake valve operation mechanism 31, an exhaust valve 40 and an exhaust valve operation mechanism 41. An exhaust cam 42 that constitutes the exhaust valve operation mechanism 41 has a normal cam profile 421 for operating the exhaust valve 40 in the exhaust stroke and an exhaust gas introduction cam profile 422 formed at a phase angle of about 90° behind the cam profile 421 in the direction of rotation. The thus constituted exhaust cam 42 operates, as shown in FIG. 4, the exhaust valve 40 in compliance with an exhaust valve lift curve (1) based on the cam profile 421 and in compliance with an exhaust valve lift curve (2) base on the exhaust gas introduction cam profile 422 for a short period of time during the intake stroke (during the intake valve lift curve based on the intake valve operation mechanism 31). In the embodiment shown in FIG. 3, therefore, the exhaust gas introduction cam profile 422 formed on the exhaust cam 42 works as an exhaust gas introduction mechanism for introducing exhaust gas into the cylinder during the intake stroke. The amount of lifting of the exhaust valve 40 by the exhaust gas introduction cam profile 422 may be from about 1 mm to about 3 mm.

Another embodiment of the exhaust gas introduction mechanism will be next described with reference to FIG. 5. In the embodiment shown in FIG. 5, the same members as those of the embodiment of FIG. 3 are denoted by the same reference numerals but their description is not repeated.

Figure 5:
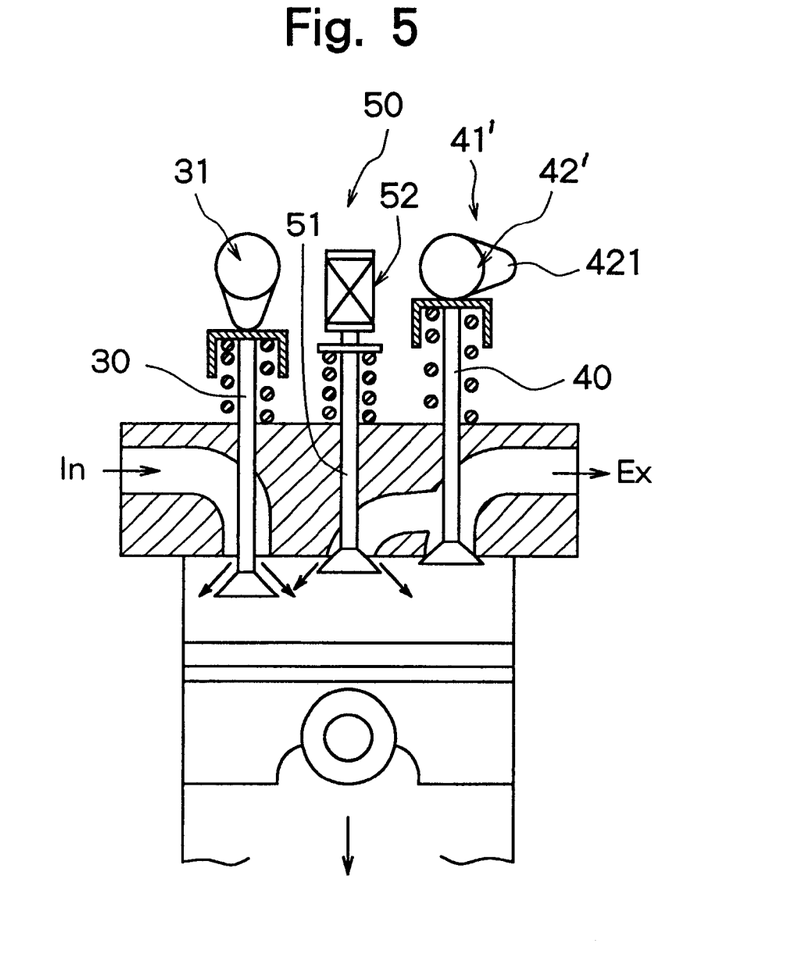
FIG. 5 is a diagram illustrating another embodiment of the exhaust gas introduction mechanism used in the present invention.

In the embodiment shown in FIG. 5, the exhaust cam 42' constituting the exhaust valve operation mechanism 41' is provided with the normal cam profile 421 only. The exhaust gas introduction mechanism 50 in the embodiment shown in FIG. 5 comprises an exhaust gas introduction valve 51 for opening the exhaust gas passage in the identical cylinder into the cylinder during the intake stroke, and an electromagnetic solenoid 52 for operating the exhaust gas introduction valve 51. The thus constituted exhaust gas introduction mechanism 50 is such that when the exhaust gas temperature of the engine is in a temperature range lower than a predetermined temperature region, a drive signal is supplied to the electromagnetic solenoid 52 from the control means 10, and the exhaust gas introduction valve 51 is driven open during the intake stroke.

In the embodiment shown in FIG. 1, there is an exhaust gas temperature region detecting means for detecting the exhaust gas temperature region of the diesel engine. The exhaust gas temperature region detecting means will now be described.

Figure 6:
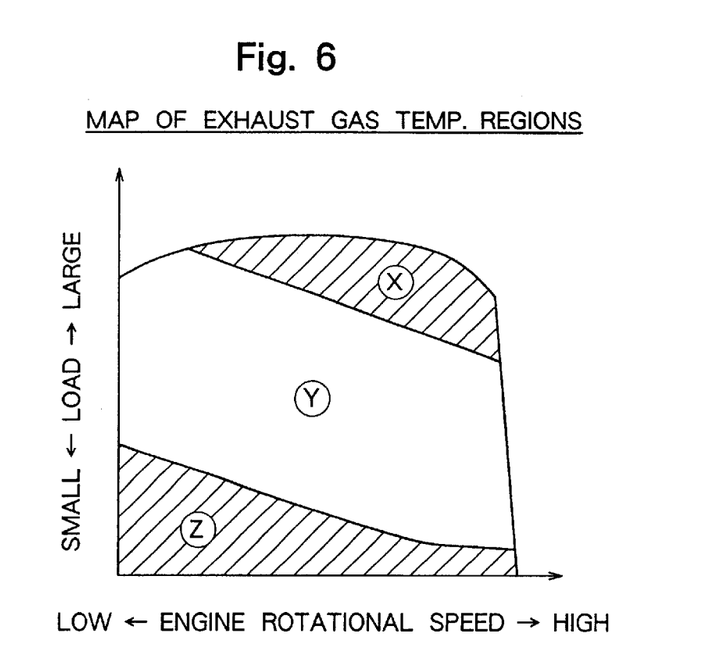
FIG. 6 is a diagram illustrating a map of exhaust gas temperature regions in the present invention.

The exhaust gas temperature of the engine is determined chiefly by the fuel injection amount (load) supplied to the engine and the engine rotational speed. The control means 10 in the device for purifying exhaust gas according to the illustrated embodiment has an internal memory (not shown) which stores a map of exhaust gas temperature regions using the engine rotational speed and the engine load as parameters, as shown in FIG. 6, and detects in what region the exhaust gas temperature lies from the engine rotational speed and the fuel injection amount (load). The region referred to here stands for a temperature region of the exhaust gas emitted from the cylinder.

The regions X, Y and Z shown in FIG. 6 are set chiefly by making reference to the test results of the exhaust gas temperatures of the engine and to the active temperature region of the oxidizing catalyst 121 at the time of defining the map. The region X is a region higher than the active temperature region of the oxidizing catalyst 121, the region Y is included in the active temperature region of the oxidizing catalyst 121, and the region Z is a region lower than the active temperature region of the oxidizing catalyst 121.

It needs not be pointed out that the boundary lines can be suitably changed by the user depending upon the operation characteristics of the diesel engine and the characteristics of the oxidizing catalyst 121 that is employed. The temperature regions need not necessarily be limited to three but may be divided into more regions. Or, there may be only two regions.

Figure 9:
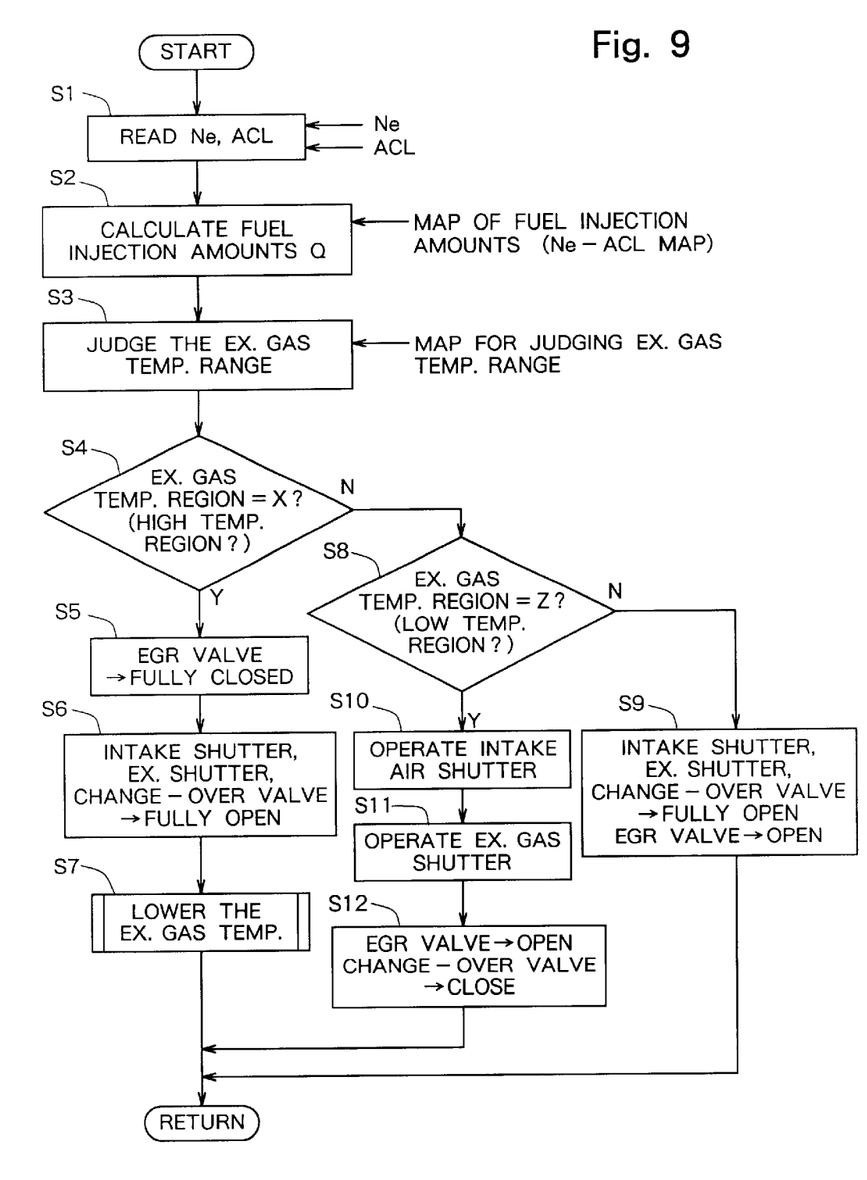
FIG. 9 is a flowchart illustrating the control operation of the control means in the present invention.

Next, the operation of the device for purifying exhaust gas according to the embodiment of FIG. 1 will be described with reference to the flowchart of FIG. 9. When the engine starts operating, fuel is supplied to the engine by a fuel injection device that is not shown. The control means 10 reads an engine rotational speed signal (Ne) and an accelerator pedal depression amount (ACL) signal from the engine rotational speed sensor 15 and the accelerator pedal depression sensor 16 (step S1), and makes a reference to the so-called map of fuel injection amounts shown in FIG. 13 to determine the amount of fuel injection (step S2). The control means 10 detects the amount of fuel injection at this moment as the engine load Q.

In the device for purifying exhaust gas of the embodiment shown in FIG. 1, after the engine load Q is detected, the control means 10 detects the present exhaust gas temperature region from the map of exhaust gas temperature regions shown in FIG. 6 based on the engine load and the engine rotational speed that has been detected (step S3). When the present exhaust gas temperature region has been thus detected, the control means 10 controls the EGR valve 11, the intake air shutter 22 and the exhaust gas shutter 23 in compliance with the control map shown in FIG. 7 based on the present exhaust gas temperature region.

Figure 7:
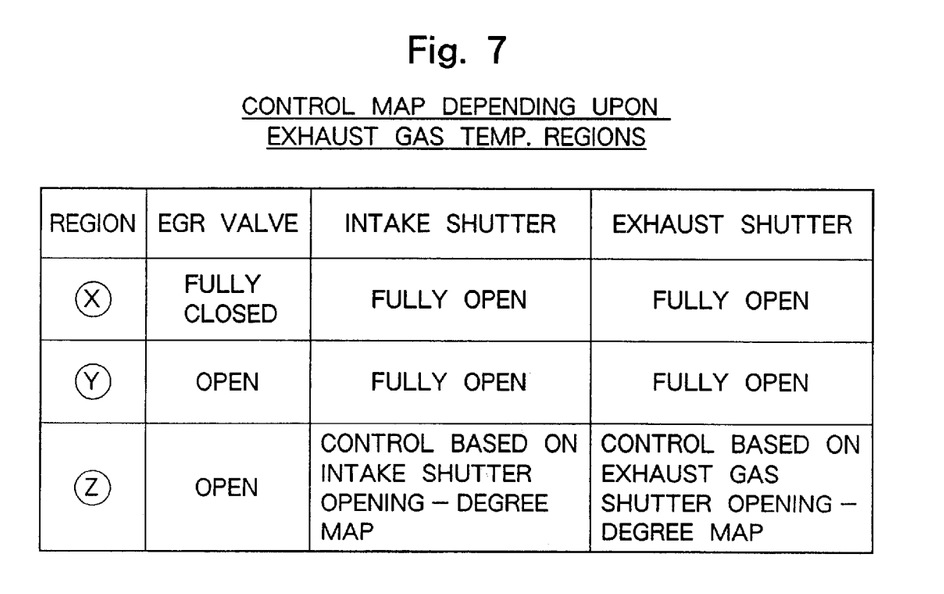
FIG. 7 is a diagram illustrating a control map depending upon the respective exhaust gas temperature regions in the present invention.

First, when the exhaust gas temperature region is the high temperature region X of the oxidizing catalyst (step S4), the control means 10 fully closes the EGR valve 11 (step S5) and fully opens the intake air shutter 22, exhaust gas shutter 23 and change-over valve 102 (step S6) in compliance with the control map of FIG. 7. The control means 10 then executes the control operation to lower the exhaust gas temperature (step S7). The control operation for lowering the exhaust gas temperature is to controlby, for example, increasing of the amount of the intake air by using a variable turbo charger or cooling of the exhaust gas by using cooling water. The control operation for lowering the exhaust gas temperature is not a chief constituent element of the present invention and hence, is not described here.

When the exhaust gas temperature region is not X at step S4, the control means 10 proceeds from step S4 to step S8 where it judges whether the exhaust gas temperature region is the low temperature region Z or not. When it is judged that the exhaust gas temperature is not the low temperature region (but is the active temperature region Y), the control means 10 proceeds to step S9 where it fully opens the intake air shutter 22, exhaust gas shutter 23 and change-over valve 102. The EGR valve 11 is also opened at step S9, but the control means 10 may execute the EGR control operation at the time of the normal operation.

Figure 8A:
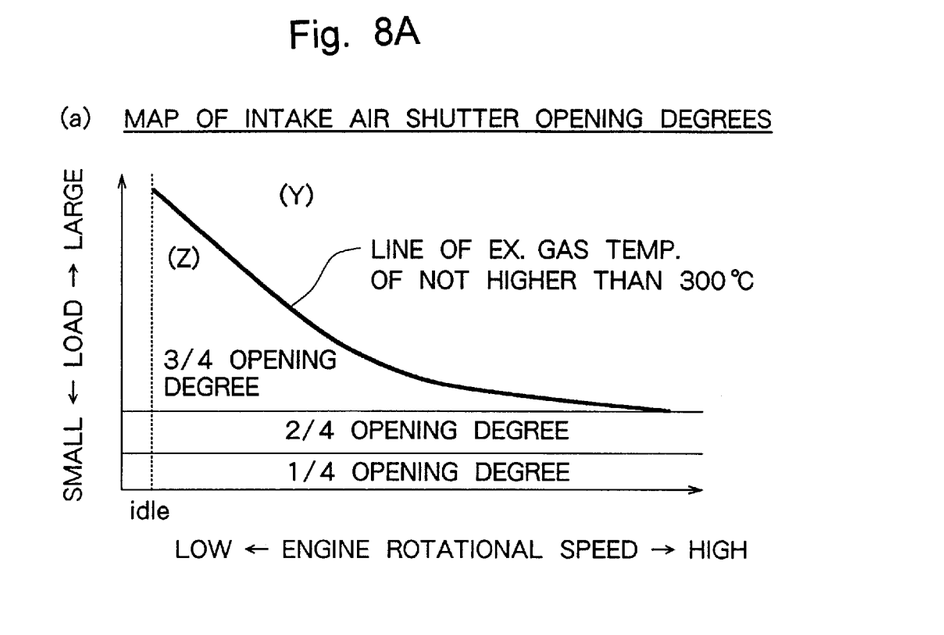
FIGS. 8A and 8B are diagrams illustrating maps for controlling the opening degrees of, respectively, an intake air shutter and an exhaust gas shutter in the present invention.
Figure 8B:
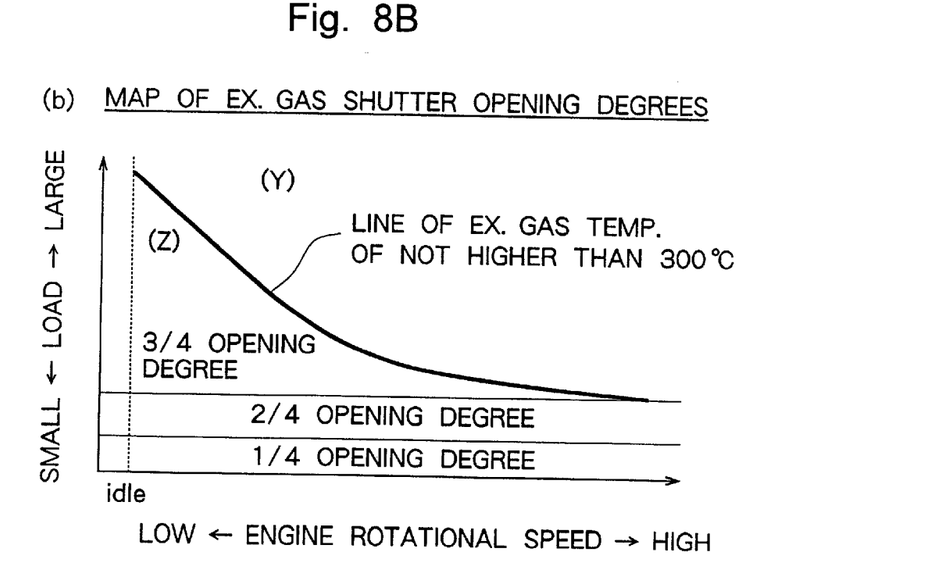

When it is judged at step S8 that the exhaust gas temperature region is the low temperature region Z, the control means 10 proceeds to step S10 to operate the intake air shutter, thereby to squeeze the intake air shutter based on a map of intake air shutter opening degrees as shown in FIG. 8A. The control means 10 then proceeds to step S11 to operate the exhaust gas shutter 23, thereby to squeeze the exhaust gas shutter based on a map of exhaust gas shutter opening degrees as shown in FIG. 8B. The maps shown in FIGS. 8A and 8B are the ones obtained by further subdividing the region Z of the map used for the exhaust gas temperature region detecting means shown in FIG. 6, to set the operations for opening the intake air shutter and the exhaust gas shutter stepwise. The "¾ opening degree" indicates that the shutter is closed by ¼ from the fully opened position, and the "¼ opening degree" indicates that the shutter is closed by ¾.

The control means 10 further proceeds to step S12 to open the EGR valve 11 and to close the change-over valve 102, making a changeover from the exhaust gas passage to the by-path 101 (step S12).

After having executed the above control operation, the control flowchart returns back to the start.

When the exhaust gas temperature region is the low temperature region (exhaust gas temperature region=Z) as described above, the intake air shutter 22 is squeezed to restrict the intake of the fresh air, and consequently, the pressure decreases in the intake air passage near the exit of the EGR passage 9, thereby permitting the EGR gas to recirculate in an increased amount. Further, by squeezing the exhaust gas shutter 23, the exhaust gas pressure increases in a location where the EGR passage 9 is coupled to the exhaust pipe 7 that constitutes part of the exhaust gas passage, and consequently, the EGR gas recirculates in a further increased amount. The temperature of the exhaust gas increases as the air excess ratio ($\lambda$) approaches 1 during the combustion in the cylinder and as the temperature of the intake air becomeshigher. In general, therefore, even in an operating region where the rotational speed is low, the load is small and the exhaust gas temperature does not reach the active region of the oxidizing catalyst 121, the temperature of the intake air can be elevated, the amount of the fresh air in the intake air can be decreased, and the exhaust gas temperature can be elevated up to the active temperature region Y by conducting the above-mentioned control operation. As shown in the maps of FIGS. 8A and 8B, when the exhaust gas temperature region is lower than the active temperature region Y of the oxidizing catalyst, i.e., is in the lower exhaust gas temperature region, the intake air shutter 22 and the exhaust gas shutter 23 are more squeezed, and the exhaust gas temperature is more elevated. In the illustrated embodiment, the exhaust valve 40 is opened during the intake stroke by the action of the exhaust gas introduction cam profile 422 of the exhaust cam 42 that constitutes the exhaust gas introduction mechanism shown in FIG. 3, and exhaust gas is introduced into the cylinder.

When the exhaust gas introduction mechanism 50 shown in FIG. 5 is provided, the electromagnetic solenoid 52 is driven during the intake stroke to open the exhaust gas introduction valve 51, and consequently, exhaust gas is introduced into the cylinder. Thus, when the exhaust gas temperature region is the low temperature region Z, exhaust gas of a high temperature in the exhaust gas passage flows backward into the cylinder, and, as a result, the exhaust gas temperature is elevated. Further, when the control operation is conducted to close the exhaust gas shutter as described above, the exhaust gas pressure in the exhaust gas passage increases and, hence, the exhaust gas flows backward in an increased amount into the cylinder, making it possible to further elevate the temperature of the exhaust gas. Therefore, when the exhaust gas temperature region is the low temperature region Z, the control operation for squeezing the intake air shutter 22, the control operation for squeezing the exhaust gas shutter 22, and the operation of the exhaust gas introduction mechanism all work as means for elevating the temperature of the exhaust gas of the engine.

Further, in the present invention, when the exhaust gas temperature region is the low temperature region Z, the above means for elevating the temperature of the exhaust gas is operated, and, at the same time, the change-over valve 102, disposed in the exhaust pipe 7, is closed so that the exhaust gas flows through the by-path 101, i.e., flows through the second continuous regeneration type DPF 13. The second continuous regeneration type DPF 13 is arranged nearly right under the exhaust manifold 4; that is, it is positioned to allow the exhaust gas heated by the exhaust gas temperature-elevating means to flow therethrough without its temperature being lowered by the outdoor air and the like. This eliminates the problem that the temperature of the exhaust gas drops down to be lower than the active temperature region of the oxidizing catalyst 121 in the first continuous regeneration type DPF 12 before the exhaust gas arrives at the first continuous regeneration type DPF although the temperature of the exhaust gas is elevated by the exhaust gas temperature-elevating means. That is, when the exhaust gas temperature region is at least the region Y or the region Z, PMs are trapped and at the same time, regeneration is continuously executed.

As the second continuous regeneration type DPF 13, there is employed a type having a capacity smaller than that of the first continuous regeneration type DPF 12 that has heretofore been installed. The second continuous regeneration type DPF 13 is used when the exhaust gas temperature is low or is used only in a region of relatively small loads (i.e., the amount of fuel injection is small). Namely, it is desired to decrease the capacity of the second continuous regeneration type DPF 13 in view of the fact that it is used in a region where the flow rate itself of the exhaust gas is small and where the amount of PMs in the exhaust gas is small, as viewed from the whole operating regions, and the fact that it is disposed right under the exhaust manifold 4.

In the illustrated embodiment as described above, the exhaust gas temperature region is detected based on the engine rotational speed and the load. Not being limited thereto only, however, the exhaust gas temperature region may be detected by an exhaust gas temperature sensor directly provided in the oxidizing catalyst 121 of the engine. Though the oxidizing catalyst and the DPF were described as separate members, it should be noted that the present invention can similarly be applied even to a continuous regeneration type DPF in which a material that serves as the oxidizing catalyst is directly carried by the DPF as a unitary structure, to a continuous regeneration type DPF in which a NOx occluding/reducing catalyst is carried by the DPF, and to a continuous regeneration DPF of another type which uses a catalyst having a limited temperature region in which it effectively works. In the foregoing it was described that the EGR passage 9 and the exhaust gas introduction mechanism were provided in combination. However, the EGR passage 9 is not an essential requirement and may be omitted, particularly when there is provided the exhaust gas introduction mechanism.

According to the device for purifying exhaust gas of diesel engines of the present invention, the temperature of the exhaust gas is elevated by the exhaust gas temperature-elevating means, and further, the second continuous reproduction type DPF having a small capacity is provided, separately from the conventionally employed first continuous regeneration type DPF, on the upstream side of the first continuous regeneration type DPF to permit the exhaust gas to pass through the second continuous regeneration type DPF. Therefore, the device can trap PMs while being continuously regenerated without permitting the temperature of the exhaust gas elevated by the exhaust gas temperature-elevating means to be lowered by outdoor air and the like.

What I claim is:

1. A device for purifying exhaust gas of a diesel engine, said device comprising:

a first continuous regeneration type diesel particulate filter arranged in the exhaust gas passage of the diesel engine, said first continuous regeneration type diesel particulate filter including a diesel particulate filter member and a catalyst positioned on the upstream side of said diesel particulate filter member;

a by-path having a first end connected to the exhaust gas passage upstream of said first continuous regeneration type diesel particulate filter, and a second end connected to the exhaust gas passage upstream of said first continuous regeneration type diesel particulate filter so that said by-path bypasses a portion of the exhaust gas passage on the upstream side of said first continuous regeneration type diesel particulate filter;

a second continuous regeneration type diesel particulate filter disposed in said by-path, said second continuous regeneration type diesel particulate filter including a diesel particulate filter member and a catalyst positioned on the upstream side of said diesel particulate filter member;

a change over valve for changing over the flow passage of the exhaust gas, arranged in said exhaust gas passage between the first end and the second end of said by-path;

exhaust gas temperature-elevating means for elevating the temperature of the exhaust gas of the diesel engine;

exhaust gas temperature region detecting means for detecting the exhaust gas temperature region of the diesel engine; and control means for controlling said exhaust gas temperature-elevating means and said change-over valve based on the exhaust gas temperature region of the diesel engine, detected by said exhaust gas temperature region detecting means; wherein, when the exhaust gas temperature region of the diesel engine, detected by said exhaust gas temperature region detecting means, is a temperature region lower than a predetermined temperature region, said control means actuates said exhaust gas temperature-elevating means and controls said change-over valve so that the exhaust gas passes through said second continuous regeneration type diesel particulate filter.

2. A device for purifying exhaust gas of a diesel engine according to claim 1, wherein said exhaust gas temperature region detecting means comprises an engine load detecting means for detecting the load on the diesel engine, an engine rotational speed detecting means for detecting the rotational speed of the diesel engine, and a map of exhaust gas temperature regions in which the exhaust gas temperature regions of the diesel engine are determined using the engine load and the engine rotational speed as parameters.

3. A device for purifying exhaust gas of a diesel engine according to claim 1, wherein said exhaust gas temperature-elevating means comprises an intake air shutter disposed in the intake air passage of the diesel engine.

4. A device for purifying exhaust gas of a diesel engine according to claim 1, wherein said exhaust gas temperature-elevating means comprises an intake air shutter disposed in the intake air passage of the diesel engine, and an exhaust gas introduction mechanism for opening the exhaust gas passage of a cylinder of the diesel engine during the intake stroke to the cylinder.

5. A device for purifying exhaust gas of a diesel engine according to claim 1, wherein the capacity of said second continuous regeneration type diesel particulate filter is smaller than the capacity of said first continuous regeneration type diesel particulate filter.

6. A device for purifying exhaust gas of a diesel engine according to claim 1, wherein the catalyst of at least one of said first continuous regeneration type diesel particulate filter and said second continuous regeneration type diesel particulate filter is provided on the surface of the diesel particulate filter member of such continuous regeneration type diesel particulate filter.

7. A device for purifying exhaust gas of a diesel engine according to claim 1, wherein said exhaust gas temperature-elevating means comprises an intake air shutter disposed in the intake air passage of the diesel engine, an exhaust gas introduction mechanism for opening the exhaust gas passage of a cylinder of the diesel engine during the intake stroke to the cylinder, and an exhaust gas shutter disposed in the exhaust gas passage.

8. A device for purifying exhaust gas of a diesel engine according to claim 7, wherein said control means controls at least one of the opening degree(s) of said intake air shutter and the opening degree(s) of said exhaust gas shutter so as to become small stepwise as the exhaust gas temperature region of the diesel engine detected by said exhaust gas temperature region detecting means becomes low.

* * * * *